(12) United States Patent
Eder et al.

(10) Patent No.: US 8,487,459 B2
(45) Date of Patent: Jul. 16, 2013

(54) WAVE ENERGY CONVERTER AND POWER TAKE OFF SYSTEM

(75) Inventors: James E. Eder, Doylestown, PA (US); David B. Stewart, Cranbury, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 913 days.

(21) Appl. No.: 12/587,651

(22) Filed: Oct. 9, 2009

(65) Prior Publication Data
US 2011/0084488 A1 Apr. 14, 2011

(51) Int. Cl.
F03B 13/10 (2006.01)
H02P 9/04 (2006.01)

(52) U.S. Cl.
USPC .......................................................... 290/42

(58) Field of Classification Search
USPC ............... 290/42, 53; 60/495, 496, 497, 498, 60/501, 505, 502; 417/330; 415/7
See application file for complete search history.

(56) References Cited

U.S. PATENT DOCUMENTS

| | | | | |
|---|---|---|---|---|
| 1,393,472 A * | 10/1921 | Williams | ........................ | 290/42 |
| 3,930,168 A * | 12/1975 | Tornabene | ........................ | 290/53 |
| 3,964,264 A * | 6/1976 | Tornabene | ........................ | 405/76 |
| 5,176,552 A * | 1/1993 | Kuboyama et al. | ............. | 441/16 |
| 7,687,931 B2 * | 3/2010 | Gasendo | ........................ | 290/54 |
| 7,841,177 B1 * | 11/2010 | Detwiler | ........................ | 60/497 |
| 2006/0028026 A1 * | 2/2006 | Yim | ................................. | 290/53 |
| 2006/0244332 A1 * | 11/2006 | Wyremba | ...................... | 310/179 |
| 2007/0090708 A1 * | 4/2007 | Takahashi et al. | ........ | 310/156.21 |
| 2007/0261404 A1 * | 11/2007 | Stewart et al. | .................. | 60/495 |
| 2008/0190105 A1 * | 8/2008 | Tai et al. | ......................... | 60/498 |
| 2008/0309088 A1 * | 12/2008 | Agamloh et al. | ............... | 290/53 |
| 2009/0072540 A1 * | 3/2009 | McCague et al. | .............. | 290/53 |
| 2009/0212571 A1 * | 8/2009 | Atilano et al. | .................. | 290/53 |
| 2009/0224548 A1 * | 9/2009 | Oigarden | ........................ | 290/53 |

* cited by examiner

*Primary Examiner* — Julio Cesar Gonzalez
(74) *Attorney, Agent, or Firm* — Henry I. Schanzer, Esq (57) ABSTRACT

A wave energy converter (WEC) includes a float tending to move in phase with the waves, a spar tending to move out of phase with the float and power take off device (PTO) coupled between the float and spar for converting their relative motion into useful energy. The PTO includes a rack and pinion mechanism which drives a high-torque, multi-pole, permanent magnet generator (PMG) to produce electrical signals of relatively high frequency relative to the frequency of the waves and the basic motion of the rack and pinion mechanism. In accordance with one aspect of the invention, the rack and pinion mechanism may be located within the spar which may be hermetically sealed by a sealing mechanism which allows a thrust rod coupled between the float and spar to move up and down with little friction to ensure efficient operation. In addition, a braking arrangement is provided for inhibiting relative motion between the float and spar during extreme severe wave conditions. In this way, the pinion gears and generators need only be sized for the operational wave conditions.

17 Claims, 11 Drawing Sheets

WAVE ENERGY CONVERTER AND POWER TAKE OFF SYSTEM

BACKGROUND OF THE INVENTION

This invention relates to Power Take-Off (PTO) apparatus for use with a wave energy converter (WEC) and, in particular, to an improved PTO system employing reciprocating linear motion.

In general, WECs are devices which convert mechanical energy present in ocean waves to electrical energy or any other suitable form of energy. WECs may take many different forms. The present invention is highly suitable for use with WECs which convert the wave energy motion into a reciprocating motion which is substantially linear.

Figure 1:
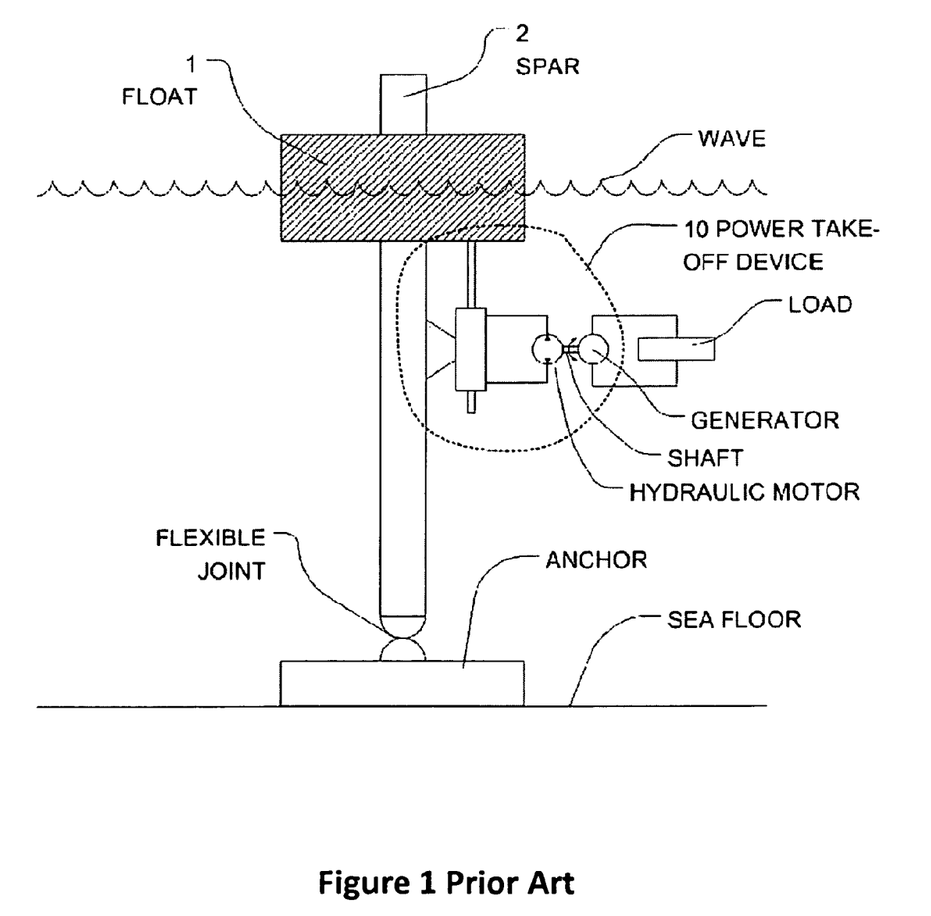
FIG. 1 is a highly simplified diagram of a prior art wave energy converter (WEC)

FIG. 1 shows a prior art WEC in which the PTO includes a hydraulic system for driving a generator/motor. The WEC shown in FIG. 1 includes two main components: a toroid-shaped float (1) and a cylindrical-shaped spar (2), with the float (1) being disposed around the spar (2). In this configuration, the float may be designed to be neutrally buoyant whereby its waterline is substantially centered at about half-way of its height. The hydrodynamic design of the system is such that the spar (2) remains substantially stationary, or at least its dynamic behavior is dominated by its inertia; while the float (1) substantially follows the motion of the waves (i.e., is generally in phase with the waves). In addition to the hydrodynamic design, the spar (2) may also be held stationary by being anchored to the sea bed (as shown in FIG. 1) or it may be held relatively stationary with the aid of a heave plate which is attached near the bottom of the spar (2).

The relative force and motion between the float (1) and spar (2) is converted into electrical energy by means of a PTO (10) connected between them. In FIG. 1, the PTO includes a hydraulic system including a motor coupled via a shaft to a generator to produce electrical energy. Due to the relatively low frequency of the waves, the corresponding electrical signals tend to be of low frequency which is very inefficient. To overcome this problem various gearing mechanisms may be introduced to increase the frequency of the electrical signals being produced. However, known gearing mechanisms tend to require substantial maintenance and replacement and tend to be inefficient and unreliable.

Other problems exist with known systems in the efficient and reliable conversion of wave energy into electrical energy.

It is an object of the present invention to overcome many of the known problems and to provide a PTO apparatus which can convert the relative force and motion of the float and spar into electrical energy in an efficient and reliable manner.

SUMMARY OF THE INVENTION

A wave energy converter (WEC) embodying the invention includes a float and a spar, with the float intended to move, generally, in phase with the waves and the spar intended to move, generally, out of phase with the float. The relative motion between the float and spar, due to waves, is converted to linear motion generating forces applied to a power take off device (PTO). The PTO is preferably, but not necessarily, located within the spar. That is, the PTO may be located externally to the spar; but it then becomes subject to corrosive action of the water.

A PTO embodying the invention includes a rack and pinion mechanism which drives a high-torque, multi-pole, typically more than 8 poles, permanent magnet generator (PMG) to produce an electrical signal of relatively high frequency relative to the frequency of the waves and the basic motion of the rack and pinion mechanism. In accordance with the invention, the frequency of the voltage produced by the generator will be at least an order of magnitude greater than the frequency of the waves. This permits the fabrication of a more reliable and efficient PTO system which does not require a gearing mechanism, other than the rack and pinion, to increase the speed of rotation and the frequency of the voltage produced by the PTO.

In accordance with an aspect of the invention, the pinion is integrally connected to the shaft of the generator and the shaft is connected to, and drives, the rotor of the generator.

In accordance with another aspect of the invention, the rack and pinion mechanism is located within the spar and is driven by a thrust (push) rod which is responsive to the relative motion between the spar and the float and which passes through an aperture in the spar. At the site of the aperture, a compliant sealing mechanism is formed between the spar and the thrust rod to inhibit the flow of sea water within the spar and to allow the thrust rod to move up and down with little friction to ensure efficient operation.

In accordance with another aspect of the invention, multiple pinion gears may be mounted along a rack to drive multiple generators, simultaneously, producing outputs which can be combined.

In addition, a braking arrangement may be provided for selectively inhibiting relative motion between the float and spar during certain conditions, such as extreme severe waves or when the WEC is to be serviced. The "braking" allows for the pinion gears and generators to be sized only for operational wave conditions. The braking arrangement may include a frictional brake (e.g., a caliper brake) and/or an electromagnetic brake.

Furthermore, WECs embodying the invention include kinematical linkages (e.g., one or more ball joints) between various moving parts to enable smoother and more efficient and reliable transmission of forces applied at different angles.

In a particular embodiment, the relative motion between the float and spar, due to the waves, is used to drive a push (thrust) rod mechanically coupled to the float to impart a corresponding linear motion to a rack whose teeth are engaged with those of a pinion gear; with the pinion gear held stationary with respect to the spar. The rack and pinion mechanism converts the linear motion to rotary motion (either directly or via a speed enhancing gear box). The pinion gear is then directly coupled to the rotor of a brushless torque motor/generator. A motor/generator with brushes may also be used, but the brushes tend to wear out and require frequent replacement.

In an alternative embodiment of this invention, the pinion gear (or gears) and generator (or generators) can be coupled to the thrust rod so as to move back and forth (or up and down) and still be free to rotate while the rack is held fixed with respect to the spar.

In WECs embodying the invention, the float is coupled to the thrust rod via a relatively coarse system, while the internal rack and pinion mechanism is more precisely designed to increase positive coupling and decrease friction.

BRIEF DESCRIPTION OF THE DRAWINGS

In the accompanying drawings which are not drawn to scale, like reference characters denote like components.

DETAILED DESCRIPTION OF THE INVENTION

Figure 2:
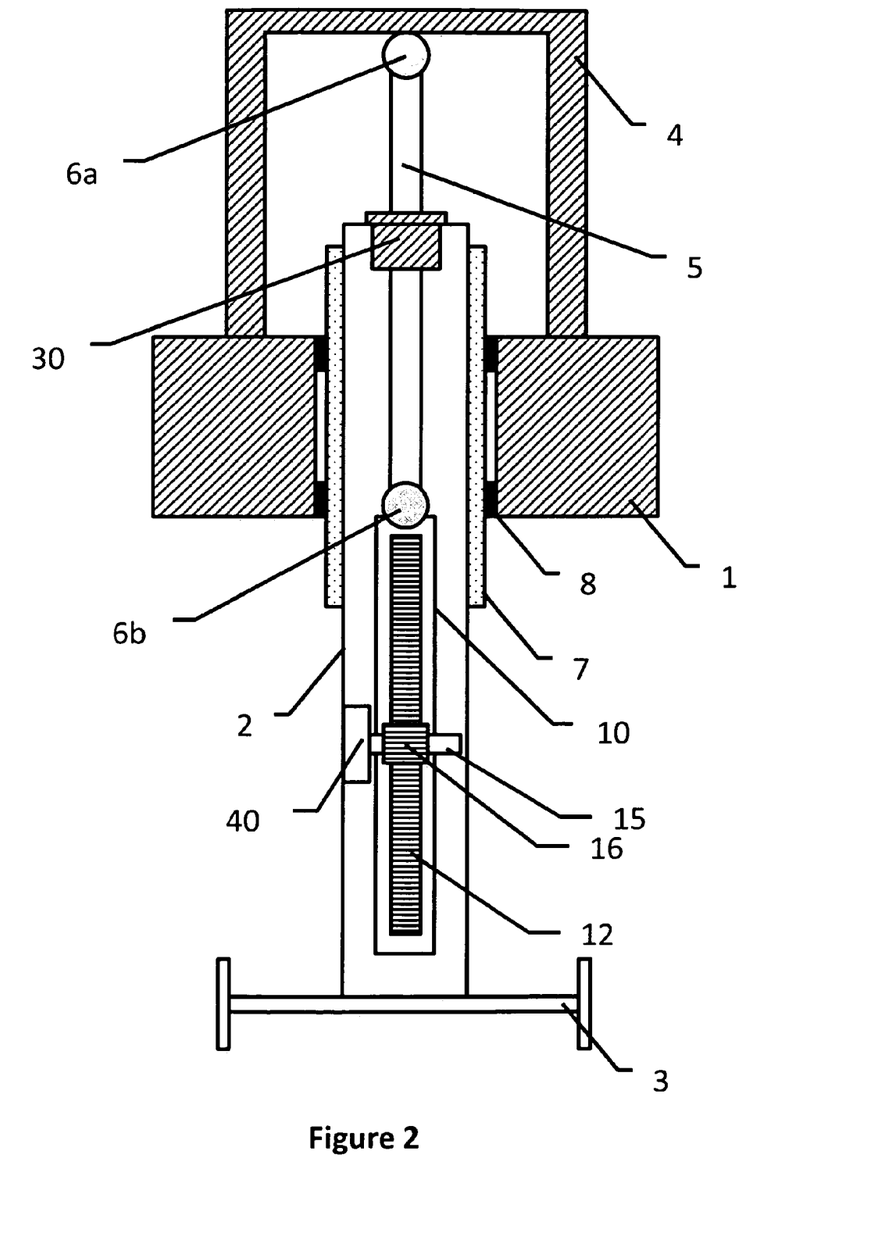
FIG. 2 is a simplified cross sectional diagram of a WEC which may be used to practice the invention.

FIG. 2 shows a WEC which embodies the invention and which is intended to be placed in a body of water subjected to wave motion of varying amplitude and frequency. The WEC includes apparatus suitable for producing reciprocating linear motion. The WEC shown in FIG. 2 includes two major components, a float 1 and a spar 2. The float is designed to move generally in phase with the waves and the spar is designed to be stationary, or to move generally out-of-phase with respect to the waves. Thus, in response to the waves in a body of water in which the WEC is positioned, there is relative linear motion between the float and spar.

In FIG. 2, a heave plate, 3, which may be made of steel, is shown attached to the bottom submerged portion of the spar. The heave plate provides a substantial amount of "added" mass to the spar, allowing it to remain relatively fixed in the water column. This "added" mass is only partly due to the mass of the steel comprising the heave plate 3. It is mostly due to the much more massive volume of water which surrounds the heave plate 3. The "added" mass of the water surrounding the heave plate is effectively added to the spar 2 since this water must move around the heave plate in order for the spar 2 to move with respect to the water column. The effective mass of the spar is thus increased and it's movement will be out of phase with that of the float.

The float is coupled to a bridge structure 4 to which is fixedly attached a thrust (push) rod 5 which is coupled to a PTO housing 10 disposed within the spar 2. As the waves move up and down, the float moves up and down with the spar stationary or moving out of phase. The motion of the float which corresponds to, and is generally in phase with, the wave motion is translated into a substantially linear (up/down) motion of the thrust rod which is communicated to designated portions of the PTO system 10 which is essentially connected between the float and spar. That is, portion(s) of the PTO (e.g., rack) are connected to and move with the float and portion(s) of the PTO (e.g., stator of generator) are connected to and move as the spar moves.

To provide smoother motion of the float relative to the spar, WECs embodying the invention may include external bearing rails 7 and external bearing pads 8 to guide the float along the spa, as shown in FIG. 2. In FIG. 2, the PTO is shown embedded inside the spar 2 and is designed to fit and be contained within the spar envelope. The PTO system is housed within the spar body so as not to be directly subjected to the harsh sea environment. But, the PTO system may be located externally to the spar to meet other system considerations.

Figure 3A:
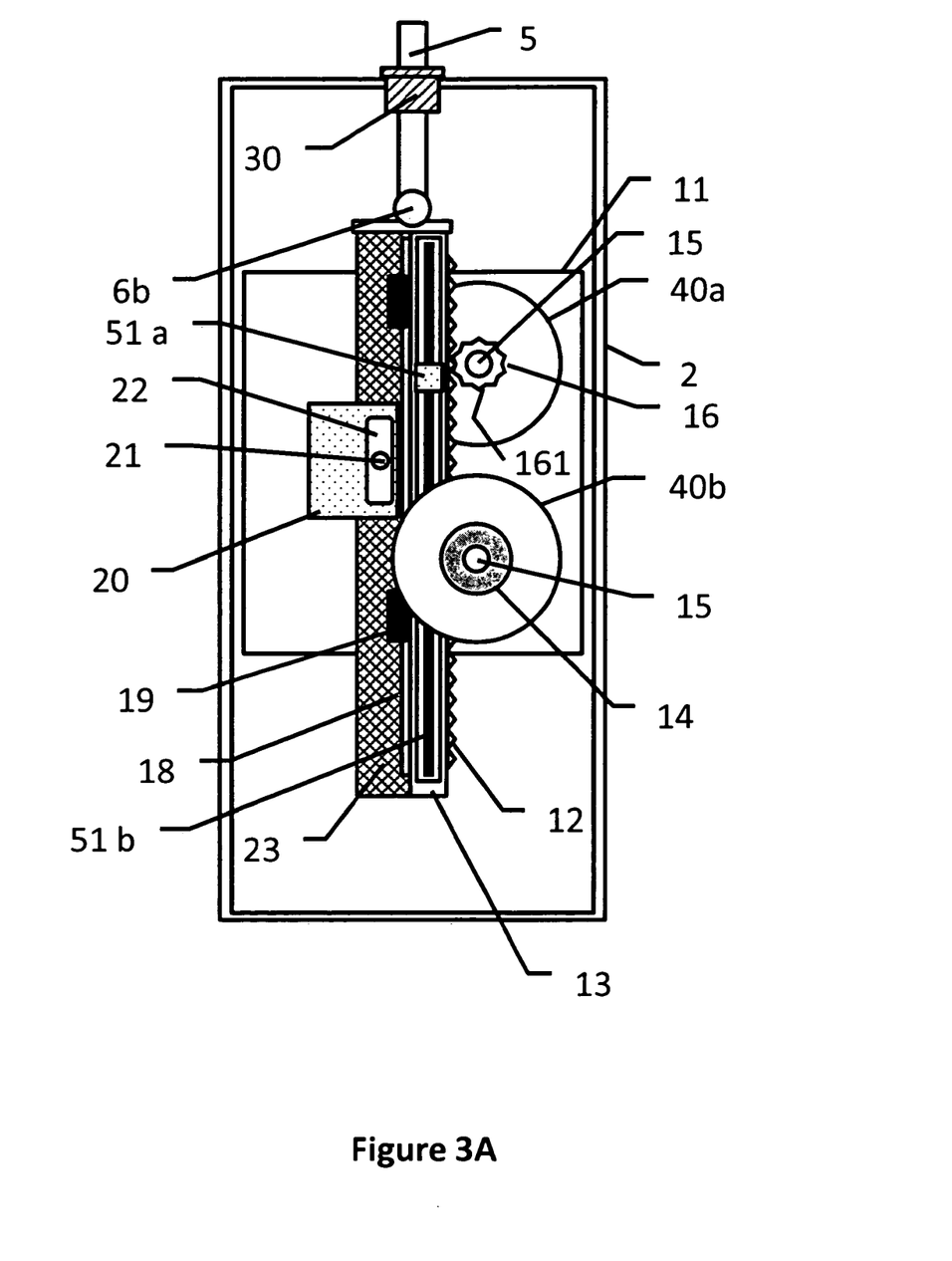
FIGS. 3A, 3B and 3C are three simplified views of a rack and pinion PTO which may be used in the WEC of FIG. 2, to practice the invention.

To provide more efficient and reliable transmission of forces from the bridge 4 to thrust rod 5 and from the thrust rod to the PTO, the WEC includes ball joints (e.g., 6a, 6b). Thus, in FIG. 2, the movement of the float which drives the bridge 4 is imparted to the thrust rod 5 via an upper ball joint 6a connected between the bridge and the rod. The ball joint (6a) allows for the float bridge (4) to rotate with respect to the thrust rod while still allowing for vertical loads to be transmitted to the PTO. The top end of thrust rod 5 is shown coupled to upper ball joint 6a and the bottom end of the thrust rod is shown coupled to bottom ball joint 6b. The thrust rod passes through a compliant seal 30 designed to hermetically seal the portion of the spar containing the PTO. The bottom end of the thrust rod is designed to drive (directly or via lower ball joint 6b) a rack 12 and associated components which form part of PTO 10, as shown in FIG. 3A. The ball joints enable a smoother and more efficient and reliable transmission of forces, applied at differing angles, to the PTO and for tighter precision bearings used in the PTO.

Figure 3B:
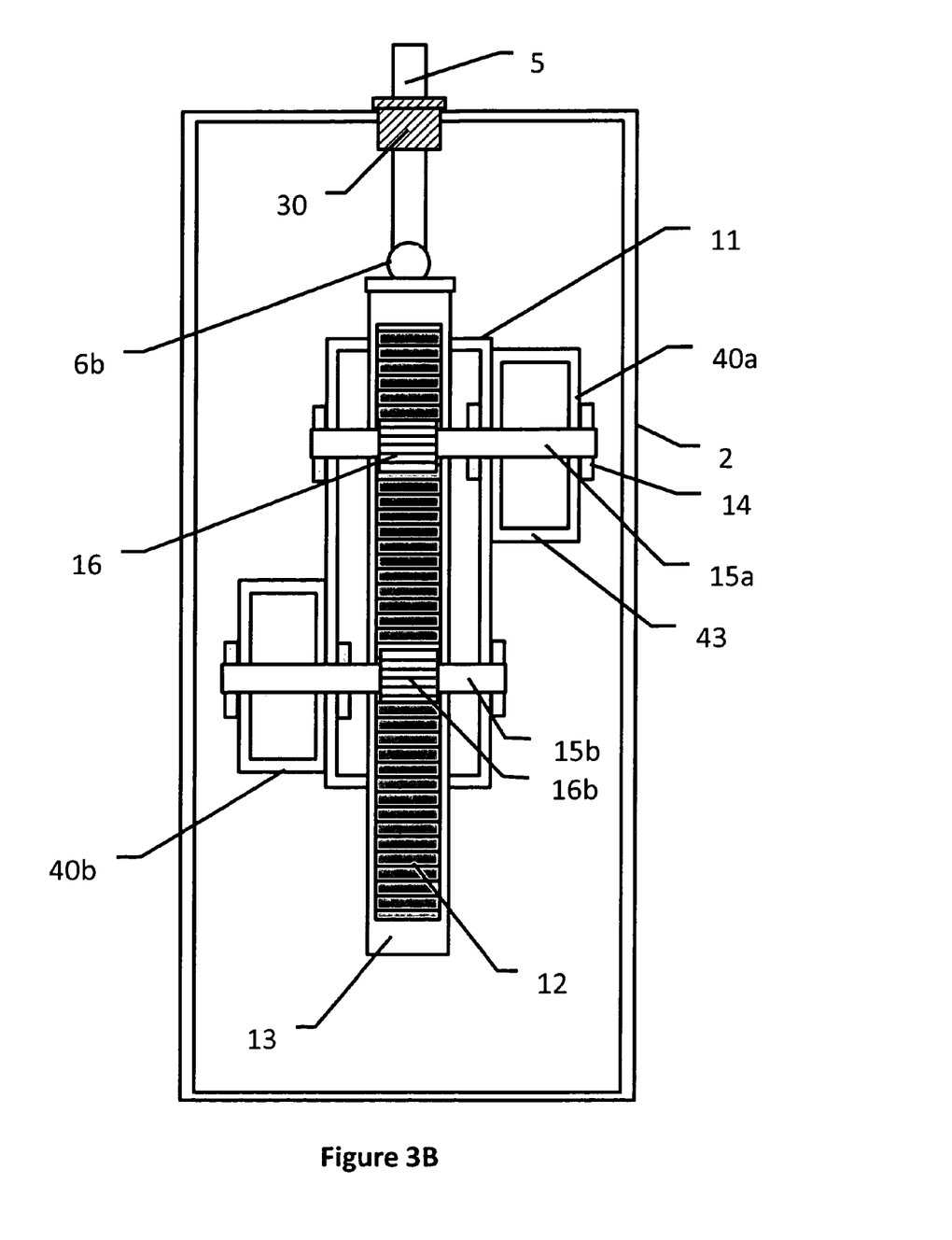
Figure 3C:
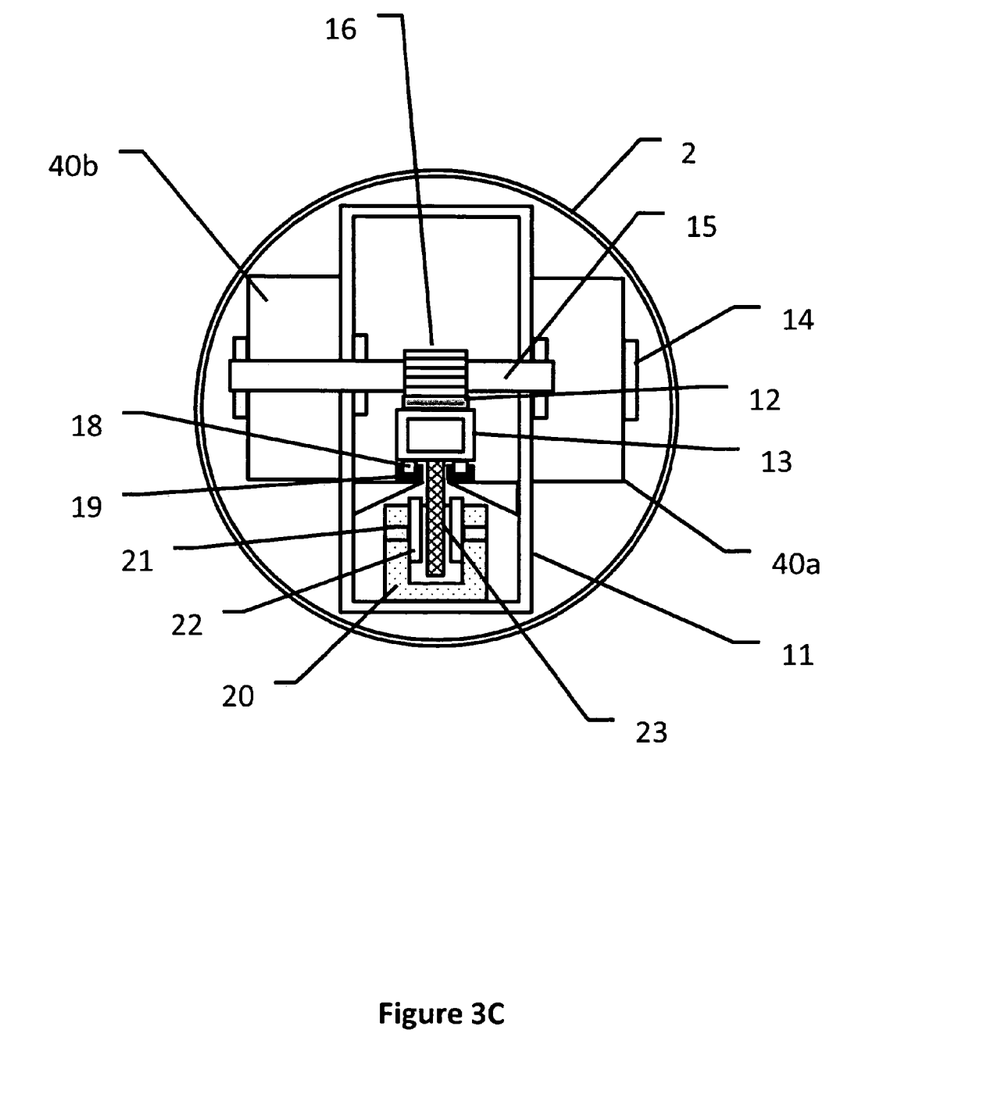

The PTO system 10 embodying the invention may employ a rack and pinion drive train of the type shown in FIGS. 3A, 3B and 3C to convert linear reciprocating motion into electrical energy. The thrust rod 5 is driven back and forth (or up and down) by the float 1 to which it is connected via the bridge arrangement 4. The thrust rod 5 is connected to rack apparatus which includes a "toothed" rack assembly 12 overlying a rack support 13 to which is connected a brake rotor flange 23. The rack assembly moves in tandem with the movement of the thrust rod. The rack assembly 12 passes back and forth through and along a PTO mechanical housing 11 in which are located pinion gears 16, which rotate as a function of the back and forth linear motion of the rack assembly 12. Thus, linear force and motion is communicated to the PTO system 10 through thrust rod 5 which is connected between the bridge 4 and the rack 12. The linear force and motion of the rack 12 is then converted into rotational torque and motion by use of pinion gears 16 when they engage the teeth of the rack. The mechanical/frame housing 11 of PTO 10 is fixedly connected to the spar 2 body so as to transmit all mechanical reaction forces between the float 1 and the spar 2 and to have relative linear motion between the PTO mechanical housing 11 and the rack 12. The PTO housing 11 may be constructed of metal (or any other suitable material) of sufficient thickness (e.g. 1 inch) to withstand the loads and reaction forces communicated between the float 1 and spar 2. The PTO frame 11 may be formed of steel panels that are machined after welding. Alternatively, the PTO frame may be a bolt-together structure which provides both weight and cost improvements with no sacrifice in performance. The mass of the rack assembly and of the PTO frame 11 and attached components are accounted for in the float buoyancy calculation and in the spar buoyancy calculation.

Figure 5:
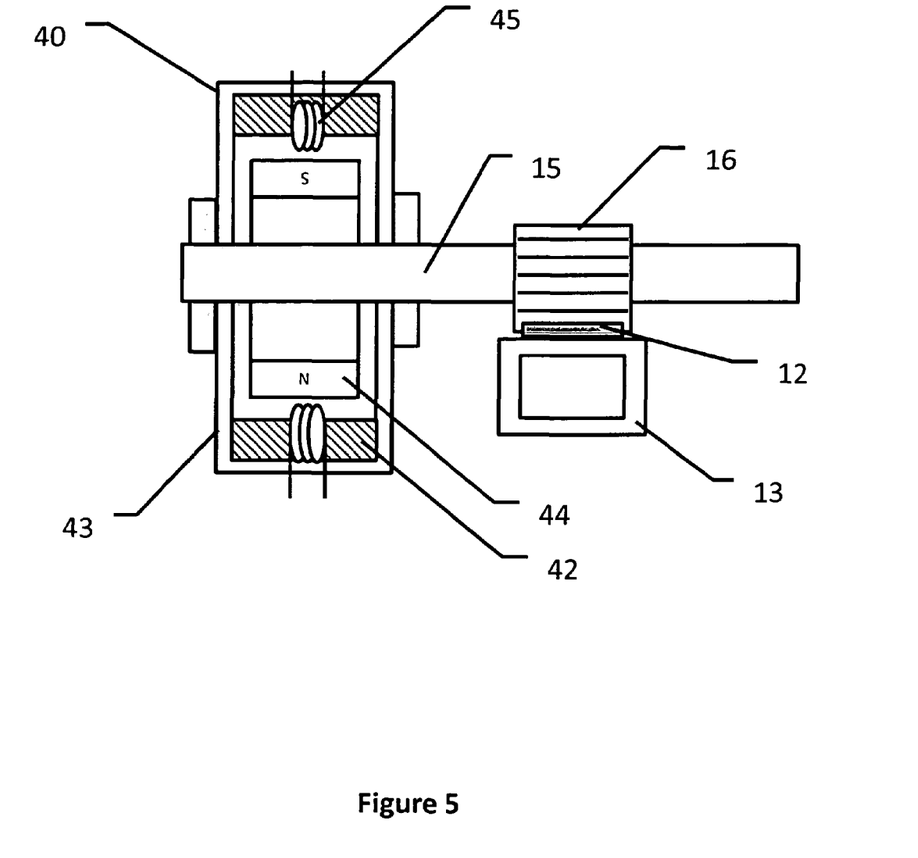
FIG. 5 is a simplified drawing illustrating additional details of the rack assembly driving a pinion gear driving a generator.

The rack 12 may be formed of multiple rack segments. The length of the rack and its width may have a wide range of values compatible with the dimensions of the inner envelope of the spar. The number of teeth per unit length of the rack 12 is made compatible with the corresponding pinion gears 16 which drive the generators. The rack segments may be mounted to, and on, a box like rack support assembly 13 (see FIGS. 3C and 5) made of any suitable material (e.g., aluminum) which provides the required stiffness while keeping the weight down. Linear bearings guide the rack 12 precisely past the pinion gears 16. The carriage bearings provide linear guidance to the rack assembly. These linear bearings consist of specially-profiled steel rails 18 and a mating set of linear bearing carriage blocks 19 which ride on the rails. The bearing rails (see FIGS. 3A and 3C) are mounted on the underside of the rack support assembly 13 and the carriage blocks are fixed with respect to the PTO housing 11. A rack and pinion PTO, which includes a plurality of pinion gears, requires precision alignment between the rack teeth and pinion gear teeth. A set of linear bearings and rails (18, 19) prevent off-axis forces being seen by the pinion gears 16 and maintain the required precision rack-gear interface, and ultimately assure reliable, efficient and long-life operation. As shown in the figures, in addition to fixing the pinion gears 16, the rack assembly 12 is guided by a pair of profiled rail linear bearings 18, 19. The profile rails 18 are affixed directly to the rack assembly 12, while the bearing carriages, which ride on the profiled rails, are affixed to the PTO housing 11. In this manner, inadvertent lateral forces applied to rack assembly are reacted against allowing pure linear motion to be transmitted to the rack assembly 12.

Means (not shown) may be provided for automatically lubricating the rack and associated components.

FIGS. 3A and 3B show two pinion gears (16a, 16b) used to drive two corresponding generators (40a, 40b). The pinion gears are designed to have a number (e.g. 20) of teeth 161 compatible with the rack's teeth. The pinion gears 16 are fixedly connected to motor/generator shafts 15 which drive the rotors of the generators and whose rotary motion is supported by rotary bearings 14. Thus the motor shafts 15 are integrated into a unitary pinion gear 16 (see FIGS. 3A, 3B, 3C and 5). The combination of integral pinion 16 and shaft 15 eliminates a high-torque coupling between the pinion gear and motor shaft.

Two generators (40a, 40b) are shown located within the PTO housing 11; but, if space permits, more (or less) generators may be used and located within the PTO. The construction and operation of each motor/generator 40 for use in practicing the invention is best explained with references to FIGS. 5, 6A and 6B. A generator 40 includes a stator portion 42, which may be fixedly connected to the PTO frame, and a rotor portion 41 fixedly connected to the shaft 15 driven by pinion gear 16. The rotor portion includes a large number (e.g., 80, or more) of North-South magnetic pairs 44 disposed along the periphery of the rotor and the stator portion includes a similar large number of coils 45 also disposed along the periphery of the stator. The large number (e.g., 80) of poles (N-S magnet pairs) enables the frequency of the voltage signals generated by the generator to be much higher than the frequency of the waves.

This stator/rotor generator design eliminates the need for gear boxes to be connected to the pinion gears to increase the rotational speed and the frequency of the output signals. Gear boxes perform a useful function; but in WEC systems their use is problematic because of inertia, wear and tear, difficulty to replace and a decrease in the reliability and efficiency of the system.

For example, in one embodiment, the linear motion of the rack and pinion mechanism causes a rotor (connected to the pinion gear) to rotate at approximately 2.6 revolutions per second in response to a relative movement of 1 meter per second between float and spar, to produce an AC voltage having a frequency of approximately 104 cycles per second.

The proposed generator used in this invention may be termed a "torque motor". Although torque motors operate on the identical principle to that of a conventional brushless dc permanent magnet motor/generator, the torque motor typically has 5 to 10 times more magnetic pole pairs than a conventional motor/generator. This means that for a given shaft speed the electrical frequency generated from a torque motor will be 5 to 10 times that of a conventional motor. The term "torque" motor arises from the fact that for a given power level, a torque motor will operate with approximately 5-10 times the torque of a conventional motor.

Since the electrical frequencies for optimum mechanical to electrical conversion are similar for torque motors and conventional motors, the optimal rotational speed will be 5 to 10 times lower for a torque motor compared with a brushless motor. Since the input maximum linear motion speed is fixed within the range of 1 m/s and it is impractical to use a single stage pinion gear to convert the linear motion to optimum speed (~1500 RPM), a speed increasing gearbox must be used in conjunction with a conventional motor. Thus, the torque motor is able to achieve the same optimal efficiency without the aid of a gear box.

Referring to the figures, note that the stator portion 42 has an outer shell 43 which is rigidly connected to the PTO housing 11. The shell 43 may form an outer cooling jacket for the stator subassembly. The generator/motor stator subassembly may contain water-cooling channels (not shown) on the outer circumference. Small "wind scoops" on the rotor subassembly (also not shown) provide cooling to the rotor through exchange of air within the generator.

As noted, the rotor portion 41 of each generator 40 is driven (rotated) by movement of shaft 15 which is driven by a pinion gear 16 which is responsive to movement of rack 12. The shaft 15 also terminates in and is supported by a rotary bearing 14 which allows smooth rotation of the generator rotor while providing a path for the linear reaction forces to be communicated to the spar 2. FIG. 6B, which corresponds to FIG. 6A, is a simplified schematic representation of the windings and magnets showing the numerous poles and coils used to increase the effective frequency of the voltage signals generated by the generator/motor 40.

A plurality of pinion gears (e.g., 16a, 16b) are positioned above the rack 12 and are made to turn (rotate) in response to the back and forth movement of the rack. The linear mechanical motion of the rack is thus converted to rotary motion of the pinion gears 16. The rotational speed of the pinion gears and their shaft is based on their gear ratio with the rack. Attached to each pinion gear 16 is the rotor portion 41 of a brushless DC torque motor/generator 40. A linear force and motion is applied to the rack via the interaction of the float 1 and the spar 2 in a direction that is in opposition to that provided by the torque motor/generator.

Figure 6A:
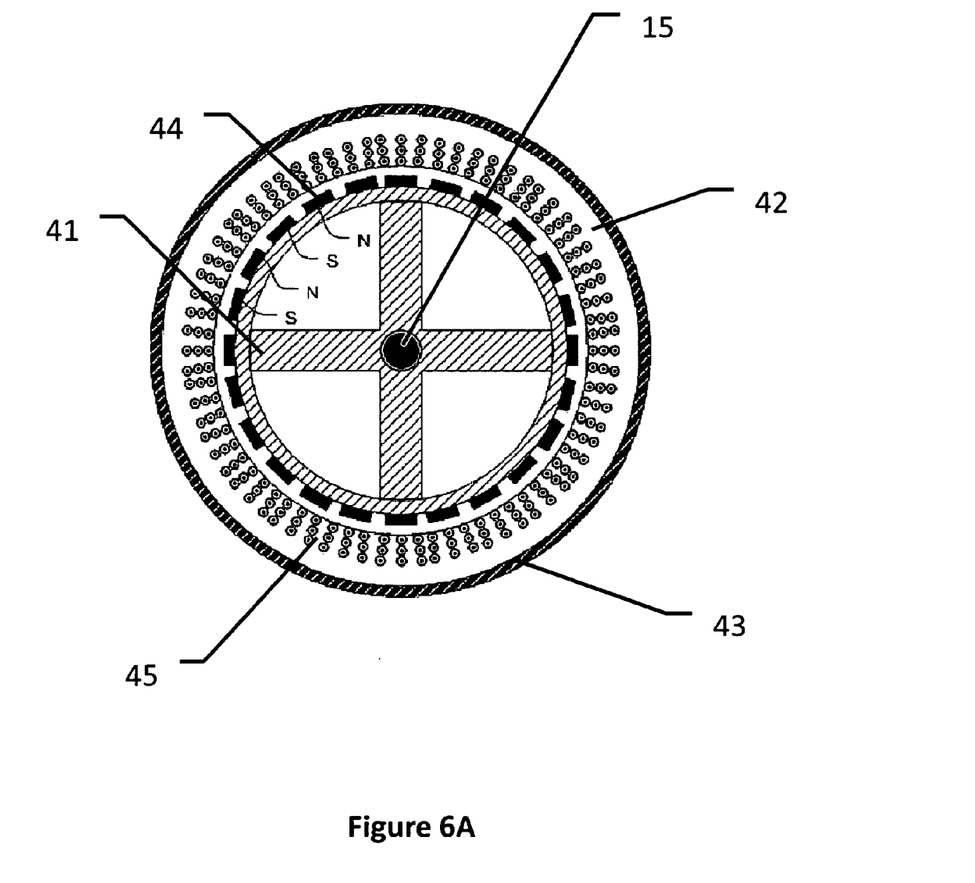
FIGS. 6A and 6B are diagrams of an electrical generator/motor for producing a relatively high frequency voltage/current output for use in a PTO embodying the invention.
Figure 6B:
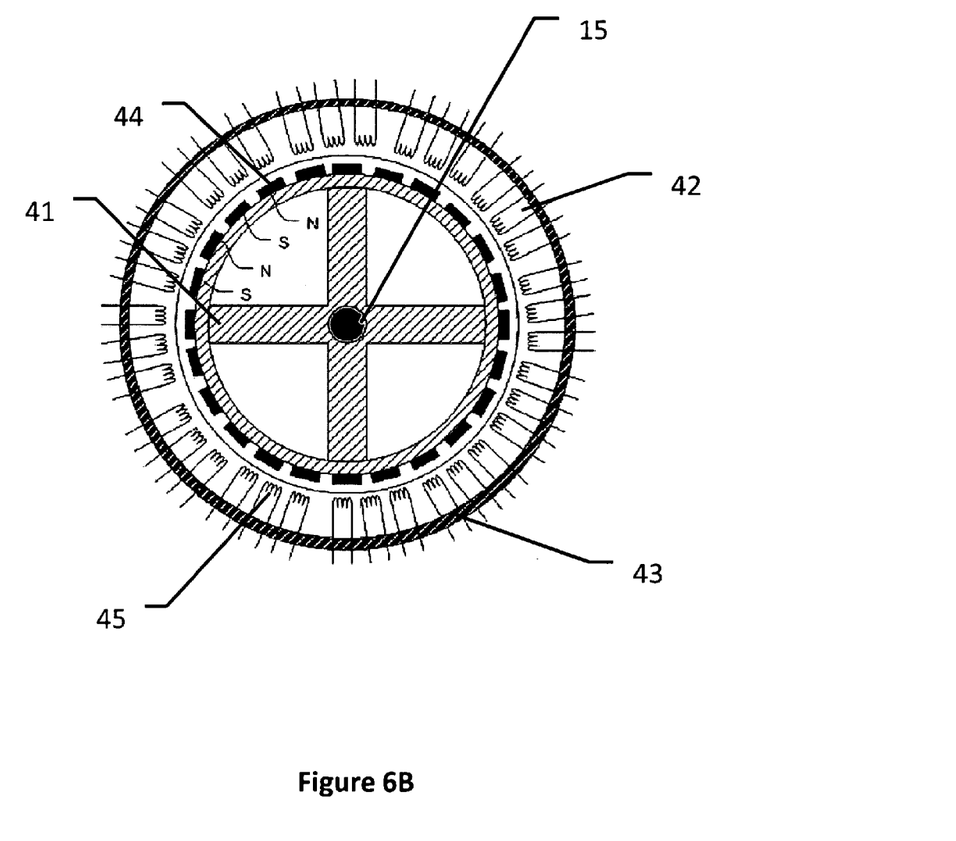

For example, as shown in FIG. 6A, in response to the float 1 moving down, the thrust rod 5 moves (vertically) down and the rack 12 moves down causing the pinion gear to rotate in the clockwise direction. The shaft of the pinion gear is fixedly and rigidly connected to the rotor of the generator causing the magnets to rotate in the clockwise direction. As the magnets 44 rotate they generate a voltage in the stator coils 45 distributed along the stator portion 42, which is rigidly connected to the spar 2 via the PTO housing 11. It is significant that in systems embodying the invention the rotor and stator may be formed, as shown in FIGS. 6A and 6B, to ensure that the frequency of the voltage signals generated in the coils is above some value for nominal movement (speed) of the rack Likewise, in response to the float 1 moving up the thrust rod 5 moves (vertically) up and the rack 12 also moves up causing the pinion gear to rotate in the counter clockwise direction. The shaft of the pinion gear is fixedly and rigidly connected to the rotor of the generator causing the magnets to rotate in the counter clockwise direction. As the magnets 44 rotate they generate a voltage in the stator coils 45 distributed along the stator 42, which is rigidly connected to the spar 2 via the PTO housing 11. As already noted, it is significant that in systems embodying the invention the rotor and stator may be formed, as shown in FIGS. 6A and 6B, to ensure that the frequency of the voltage signals generated in the coils is above some value for nominal movement (speed) of the rack. The disclosed apparatus has the advantage over previous embodiments in that the generator element is a low speed brushless DC torque motor/generator. For WEC devices, the linear velocity is typically in the range of 1 to 2 meters per second and the forces can be up to 500 kN. These high forces typically require a pinion gear which has a large pitch diameter of approximately 150 mm. At this large pitch diameter, the rotational speed of the motor is only 127 to 250 RPM. At these low rotational speeds, conventional high speed brushless DC motors are very inefficient. Conventionally, a gear box with a gear ratio of approximately 10:1 would be used between the pinion gear and the generator to increase the rotational speed seen by the generator. These gear boxes have two major drawbacks, decreasing both the efficiency and the reliability of the WEC. By eliminating this gearbox, the efficiency and reliability of the WEC PTO is substantially increased.

Figure 7:
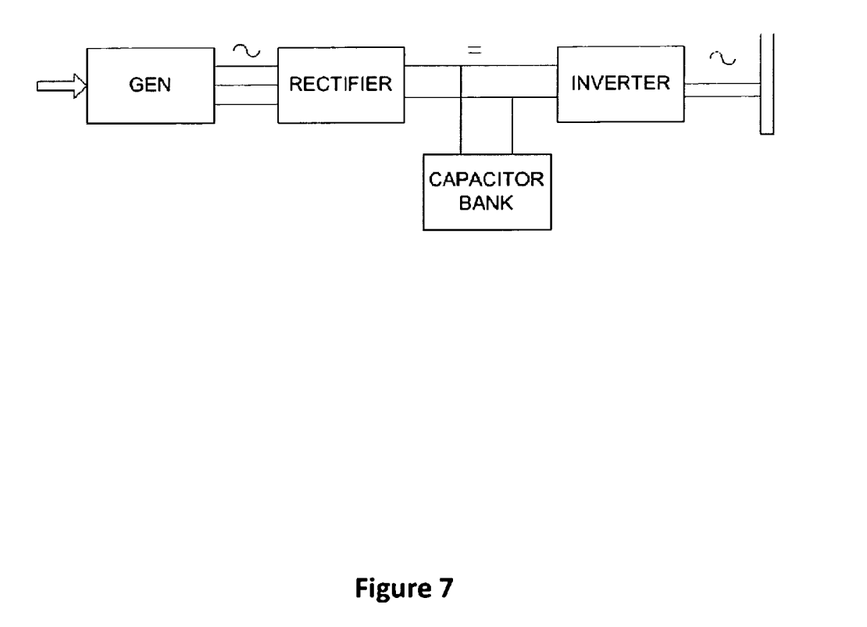
FIG. 7 is a block diagram illustrating the processing of the generator output.

FIG. 7 is a simplified block diagram showing that the output of each generator coil is fed to a rectifier whose output is smoothed and collected in a capacitor bank to establish a DC voltage. The output from the capacitor bank is then coupled to an AC inverter to produce an AC voltage which may be coupled via a cable to a power grid.

A linear position sensor 51 (see FIG. 3A) of predetermined resolution (e.g., 0.1 mm) may be mounted along the rack to provide track position to the buoy's data acquisition and control system (not shown). The linear position sensor 51 includes a first portion 51a which may be affixed to the rack assembly 13 and a second portion 51b which may be affixed to the PTO frame 11. The purpose of this sensor is to detect the relative motion between the float 1 and the spar 2. This information may be used by the PTO control system (not shown) to set the appropriate force for the PTO. This arrangement allows for optimal impedance matching algorithms to be used and extract maximum energy from the incident ocean waves.

The disclosed apparatus also has the ability to be used in conjunction with selected adaptive impedance matching algorithms. Since the PTO directly couples bi-directional linear force and motion to the generating elements, without the aid of mechanical clutches, accumulators or the like; it is possible for the PTO to operate in all four quadrants of the torque-speed plane. That is, the PTO is able to both act as a generator as well as motor in both directions. Although the PTO operates as generator for most of the time, it has been shown that brief excursions into the motoring quadrants can improve the overall electrical power output from such a configuration.

In order to implement some form of impedance matching, the relative position and velocity between the float and spar needs to be sensed and this information needs to be provided to the WEC's on-board control computer (not shown). A linear position sensor (such as sensor 51a, 51b shown in FIG. 3A) can be used. The linear position sensor may be a magnetostrictive type or any other suitable type including: photoelectric encoders, magnetic encoders and string based potentiometers.

Figure 4:
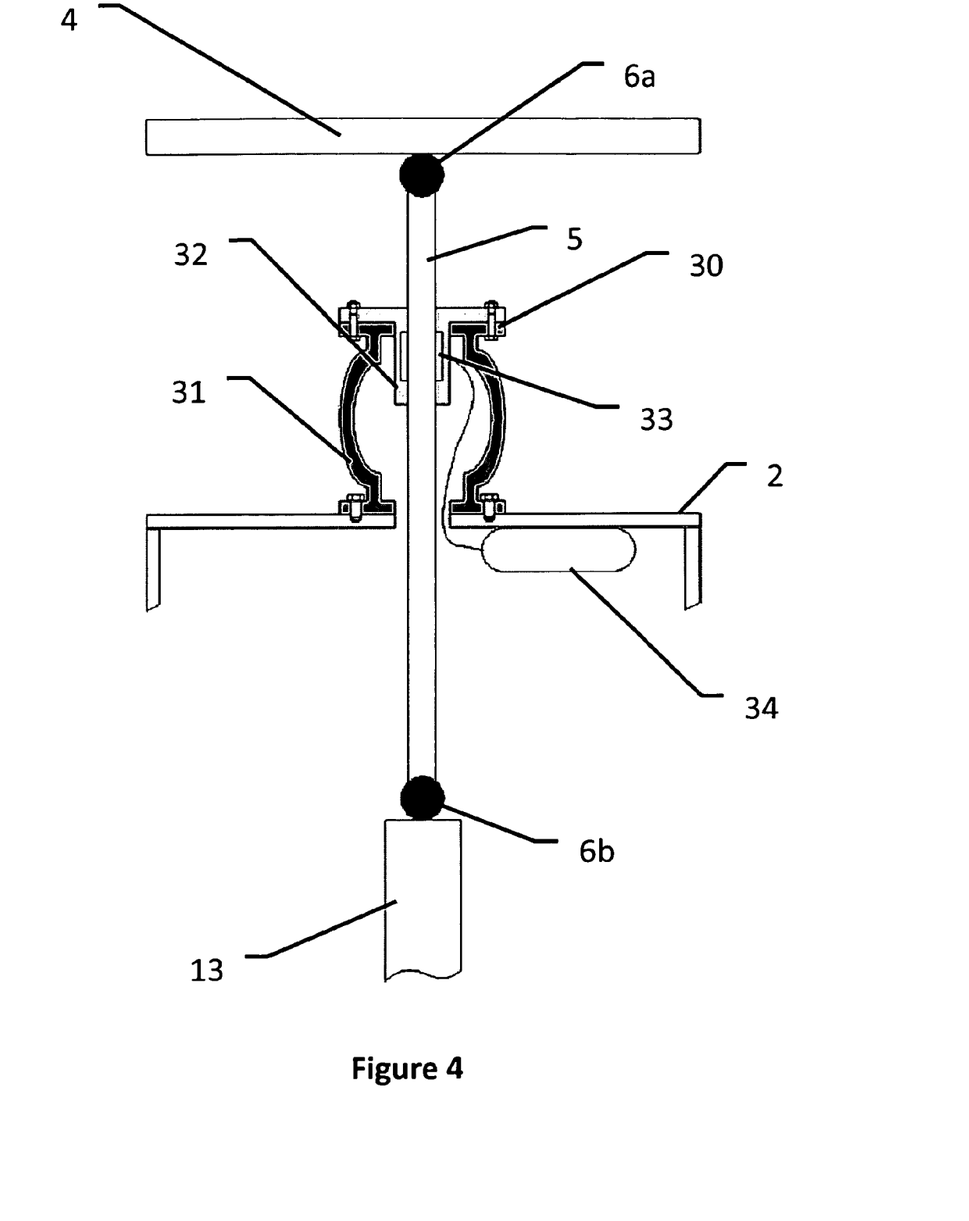
FIG. 4 is a simplified representation of sealing apparatus for blocking sea water from entering a PTO located within a spar.

A mechanical seal 30 (see FIGS. 2, 3A and 4, discussed below) is disposed at the top of the around thrust rod (5) to prevent seawater from entering the spar enclosure and affecting the PTO. FIG. 4 shows a seal 30 which can insulate the rack and pinion assembly from being affected by sea water while allowing the thrust rod (5) to move back and forth (up and down and laterally, at an angle) with little friction. The seal is formed about the thrust rod and the opening for the thrust rod in the spar and includes a compliant rubber boot (31) extending upward from the spar and forming a collar (32) which functions as a linear seal housing with a sealing material placed about the seal housing between it and the thrust rod. The compliant boot (31) allows for significant lateral motion (i.e. normal to the thrust axis) caused by misalignment and tolerances of the float and spar external linear bearings in comparison with the orientation of the linear bearings which guide the motion of the rack assembly. This compliance of boot (31) and ball joint (6a) helps to prolong the life of the seal (30) by reducing lateral reaction forces being seen by the seal. The seal (30) contains sealing material (33) that is maintained at a pressure above the pressure exerted by seawater; thus, preventing the ingress of seawater into the spar. A reservoir containing excess sealing material (34) and connected to the seal package via a hose or pipe replenishes the sealing material as it is consumed.

The relative motion between the float and spar can be controlled and limited in order to prevent over-stroking of the power take-off, the impacting of mechanical end-stops and/or damage to the WEC equipment. A mechanism for selectively locking the spar and float together includes a steel plate, or flange, 23 denoted as a "brake rotor" (See FIGS. 3A, 3C). The brake rotor 23 which may be 1 inch thick plate, is attached to the underside of the rack support assembly 13 (the side opposite to the side on which the rack 12 is attached) and extends orthogonally. The brake rotor 23 can be clamped by a caliper brake assembly 20 so it can be used as a "linear" brake "rotor." A spring loaded, hydraulically released caliper brake assembly 20 (see FIGS. 3A, 3C) is affixed to the PTO housing 11 so that the rack assembly 12 cannot move relative to the spar 2 in the event of high seas or periodic maintenance. The caliper 21 applies a braking force through brake pads (22) which squeeze upon a linear brake fin or "rotor" (23) which is fixedly attached to the rack assembly 12. The caliper brake assembly is essentially a frictional brake. It should be appreciated that an electromagnetic brake could be used in addition or instead.

Figure 8:
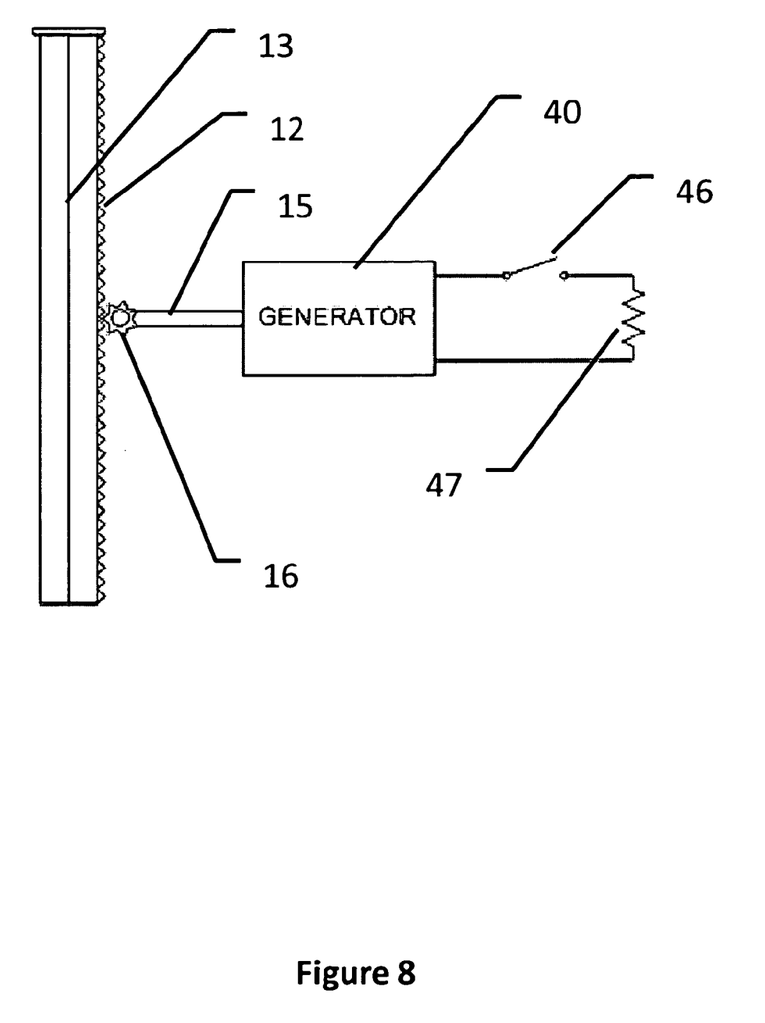
FIG. 8 illustrates a winding shorting scheme for providing braking.

As may be illustrated with reference to FIGS. 3A and 3C, a caliper brake may be selectively applied during severe storm conditions or during maintenance installation/retrieval of the buoy to limit motion between the float and spar. The caliper brake includes a caliper 21 and brake pads 22 which are activated to press against and clamp a brake rotor 23 attached to the rack support 13 on which is mounted rack 12. The caliper brake applies a clamping force and has a relatively high coefficient of friction. In one embodiment, the caliper brake is normally locked. A hydraulic power unit provides pressure to unlock. The brake locks under the following conditions: 1) high wave states, 2) low wave states, 3) maintenance, 4) asynchronous loss of electrical power, and 5) accidental loss of hydraulic pressure. Alternatively, it could be normally unlocked and locked under specified conditions, Under extremely severe conditions, the caliper brake might not have sufficient holding power to prevent motion between the float and spar. To limit the relative motion between the float and spar when this condition occurs (i.e., when the caliper brake allows slippage), the windings of the generator can be shorted by a commandable contactor, as shown in FIG. 8, to provide additional braking.

Normally, the relative displacement between the float and spar, and therefore the stroke of the PTO device, can be controlled by controlling the back-torque provided by one or more generators. Generator torque can be controlled by an "active rectifier" or "drive" that regulates the current from/to the generator. Under heavy sea conditions, the generator drive might not have sufficient current handling capability to exert sufficient control of the generator current and therefore its back-torque. In such a case, the current of, and back-torque provided by, the generator(s) can be increased by shorting the generator windings with components external to the generator. An external short provides a maximum amount of passive braking to the PTO. In some cases, it may be desirable to limit the generator braking capability. In this case, the generator windings can be connected to low-impedance resistors (e.g., 47), as shown in FIG. 8. In FIG. 8 a selectively enabled contactor switch 46 is connected in series with a resistor 47 across the generator 40 output. Decreasing the value of resistance of resistor 47 increases the current and the braking capacity of the operation.

As described above, the relative motion of the float and spar can be constrained by regulating the current and back-torque of the generator actively using a "drive" or passively by externally shorting the generator windings. Using these means of motion limiting, the PTO components (e.g. pinion gears, rack) must be sized to handle the resulting forces. Storm forces are often orders of magnitude higher than the normal operational forces. In order to keep the size and cost of the rack and pinion components to a reasonable level, it is advantageous to size the rack and pinion components only for the maximum operational forces (not the much higher forces seen during a storm). It may therefore be necessary to have some other means to stop the relative motion between the float and spar.

Thus, it has been shown that a WEC embodying the invention may include at least one of the following features:

1—A PTO using a rack and pinion to drive a multi-pole torque motor/generator;
2—A pinion gear integrally connected to a shaft connected to the rotor of the generator;
3—A kinematic linkage system for transferring forces more efficiently;
4—A compliant floating linear seal;
5—A frictional brake;
6—An electro-magnetic brake; and
7—Positional sensor(s) for use in impedance matching and other tasks.

What is claimed is:

1. A wave energy converter (WEC) intended to be placed in a body of water subjected to wave motion of varying amplitude and frequency, said WEC including:
    a first floating body and a second body intended to move relative to each other in response to the waves; and
    a power take off device (PTO) coupled to the first and second bodies and responsive to their relative motion for converting their relative motion into electric energy, said PTO comprising:
    a rack and pinion with one of said rack and pinion being coupled to one of said first and second bodies and the other of said rack and pinion being coupled to the other one of said first and second bodies; and
    wherein said pinion includes teeth for engaging said rack and said pinion having a shaft directly connected to a generator having a rotor for driving said generator rotor directly and wherein said generator is a multi-pole device for producing a voltage having a frequency which is at least an order of magnitude greater than the frequency of the waves; and
        further including a brake system for selectively locking the first and second bodies together to inhibit relative motion between them, wherein said brake system includes either: (a) a metallic flange connected to the rack apparatus and a caliper brake which is selectively activated, or (b) means for selectively shorting the windings of the generator to provide electro-magnetic braking.

2. A wave energy converter (WEC) as claimed in claim 1 wherein said generator is a brushless permanent magnet device.

3. A wave energy converter (WEC) as claimed in claim 2 wherein said generator includes a rotor and a stator, and wherein the rotor includes more than eight magnetic poles and the stator includes a plurality of windings for generating voltage signals of significantly greater frequency than the frequency of the waves; and wherein the pinion gear is directly coupled to the rotor of the generator.

4. A wave energy converter (WEC) as claimed in claim 1 wherein said pinion gear and said generator are mounted in a mechanical housing which is fixedly attached to one of said first and second bodies and wherein said rack is coupled to the other one of said first and second bodies.

5. A wave energy converter (WEC) intended to be placed in a body of water subjected to wave motion of varying amplitude and frequency, said WEC including:
    a first floating body and a second body intended to move relative to each other in response to the waves; and
    a power take off device (PTO) coupled to the first and second bodies and responsive to their relative motion for converting their relative motion into electric energy, said PTO comprising:
    a rack and pinion with one of said rack and pinion being coupled to one of said first and second bodies and the other of said rack and pinion being coupled to the other one of said first and second bodies; and
    wherein said pinion includes teeth for engaging said rack and said pinion having a shaft directly connected to a generator having a rotor for driving said generator rotor directly and wherein said generator is a multi-pole device for producing a voltage having a frequency which is at least an order of magnitude greater than the frequency of the waves; and
    wherein the first body is a float and the second body is a spar and wherein the PTO is located within the spar; and wherein movement of the float is coupled to a thrust rod which passes through an aperture in the spar and is coupled to the rack to cause movement of the rack relative to the pinion; and wherein a compliant seal is coupled between the thrust rod and the spar to block sea water from entering the spar and for allowing lateral movement of the thrust rod.

6. A wave energy converter (WEC) intended to be placed in a body of water subjected to wave motion of varying amplitude and frequency, said WEC including:
    a first floating body and a second body intended to move relative to each other in response to the waves; and
    a power take off device (PTO) coupled to the first and second bodies and responsive to their relative motion for converting their relative motion into electric energy, said PTO comprising:
    a rack and pinion with one of said rack and pinion being coupled to one of said first and second bodies and the other of said rack and pinion being coupled to the other one of said first and second bodies; and
    wherein said pinion includes teeth for engaging said rack and said pinion having a shaft directly connected to a generator having a rotor for driving said generator rotor directly and wherein said generator is a multi-pole device for producing a voltage having a frequency which is at least an order of magnitude greater than the frequency of the waves; and
    wherein the first body is a float and the second body is a spar and wherein the PTO is located within the spar; and wherein the float is coupled to a thrust rod which is designed to pass through an aperture in the spar, and to be connected to the rack and pinion apparatus to cause movement of the rack relative to the pinion; and wherein there is included a ball joint connected between the float and the thrust rod for enabling the transmission of forces due to motion of the float more efficiently and reliably.

7. A wave energy converter (WEC) intended to be placed in a body of water subjected to wave motion of varying amplitude and frequency, said WEC including:
a first floating body and a second body intended to move relative to each other in response to the waves; and
a power take off device (PTO) coupled to the first and second bodies and responsive to their relative motion for converting their relative motion into electric energy, said PTO comprising:
a rack and pinion with one of said rack and pinion being coupled to one of said first and second bodies and the other of said rack and pinion being coupled to the other one of said first and second bodies; and
wherein said pinion includes teeth for engaging said rack and said pinion having a shaft directly connected to a generator having a rotor for driving said generator rotor directly and wherein said generator is a multi-pole device for producing a voltage having a frequency which is at least an order of magnitude greater than the frequency of the waves; and
wherein the first body is a float and the second body is a spar and wherein the PTO is located within the spar; and wherein the float is coupled to a thrust rod which is designed to pass through an aperture in the spar to cause movement of the rack relative to the pinion; and wherein the rack includes a rack support assembly and a flange extending from the rack support assembly with a friction brake selectively applied to the flange for locking the float to the spar and inhibiting movement therebetween.

8. A wave energy converter (WEC) intended to be placed in a body of water subjected to wave motion of varying amplitude and frequency, said WEC including:
a first floating body and a second body intended to move relative to each other in response to the waves; and
a power take off device (PTO) coupled to the first and second bodies and responsive to their relative motion for converting their relative motion into electric energy, said PTO comprising:
a rack and pinion with one of said rack and pinion being coupled to one of said first and second bodies and the other of said rack and pinion being coupled to the other one of said first and second bodies; and
wherein said pinion includes teeth for engaging said rack and said pinion having a shaft directly connected to a generator having a rotor for driving said generator rotor directly and wherein said generator is a multi-pole device for producing a voltage having a frequency which is at least an order of magnitude greater than the frequency of the waves; and
wherein the PTO is located within the spar and there is included a compliant seal to prevent sea water from entering within the portion of the spar containing the PTO and wherein the forces associated with movement of the float are coupled to the rack and pinion apparatus via a ball joint to enable forces to be transferred more efficiently and reliably.

9. A wave energy converter (WEC) intended to be placed in a body of water subjected to wave motion includes: (a) a float and a spar intended to move relative to each other in response to the waves; and (b) a PTO coupled to the float and spar and responsive to their relative motion for converting their relative force and motion of into electrical energy, and wherein the PTO includes:
a thrust rod responsive to motion between the float and spar for transmitting linear reciprocating force; said thrust rod connected to a toothed rack assembly for causing the rack assembly to move back and forth in response to the relative movement of the float and the spar; a pinion gear engagingly connected to the rack assembly for converting its linear motion to rotary motion;
said pinion gear being connected to a shaft for driving a generator; said generator including a rotor having more than eight magnetic poles and a stator having a plurality of coils, and said shaft being connected to one of said rotor and stator for causing it to rotate about the other one of said rotor and stator and producing electrical signals in said coils; and
wherein the PTO is located within the spar and wherein said thrust rod extends from the PTO within the spar to the float, and further including a compliant seal formed about the spar and thrust rod for preventing seawater from reaching the PTO.

10. A WEC as claimed in claim 9, further including a displacement measurement system for use by control software to provide four quadrant bi-directional operation for optimal impedance matching.

11. A WEC as claimed in claim 9, further including a brake system to selectively inhibit motion between the float and spar.

12. A WEC as claimed in claim 9 wherein said rack and pinion system includes solely said rack apparatus and at least one pinion gear.

13. A WEC as claimed in claim 9 wherein said generator is a brushless torque generator.

14. A WEC as claimed in claim 9, wherein said rack and pinion system includes a plurality of pinion gears, each one of said pinion gears being connected to a generator.

15. A WEC as claimed in claim 9, wherein the rack assembly includes a rack support to which is connected a flange means for selectively inhibiting movement of the spar relative to the float.

16. A WEC as claimed in claim 9, wherein frictional and magnetic systems are included and selectively enabled to inhibit motion between the float and spar.

17. A wave energy converter (WEC) intended to be placed in a body of water subjected to wave motion includes: (a) a float and a spar intended to move relative to each other in response to the waves; and (b) a PTO coupled to the float and spar and responsive to their relative motion for converting their relative motion into electrical energy, and wherein the PTO includes:
a thrust rod responsive to motion between the float and spar for transmitting linear reciprocating force; said thrust rod connected to a toothed rack assembly for causing the rack assembly to move back and forth in response to the relative movement of the float and the spar; a pinion gear engagingly connected to the rack assembly for converting its linear motion to rotary motion;
said pinion gear being connected to a shaft for driving a generator; said generator including a rotor having more than eight magnetic poles and a stator having a plurality of coils, and said shaft being connected to one of said rotor and stator for causing it to rotate about the other one of said rotor and stator and producing electrical signals in said coils; and
wherein the PTO is located within the spar and wherein said thrust rod extends from the PTO within the spar to the float and wherein the forces generated by movement of the float are transferred to the thrust rod via a ball joint for enabling the float to rotate with respect to the thrust rod while still allowing for vertical loads to be transmitted to the PTO.

* * * * *